(12) United States Patent
Hahn et al.

(10) Patent No.: US 9,773,065 B2
(45) Date of Patent: *Sep. 26, 2017

(54) PROVIDING RELEVANT INFORMATION TO A USER BASED UPON MONITORED USER ACTIVITIES IN ONE OR MORE CONTEXTS

(71) Applicant: International Business Machines Corporation, Armonk, NY (US)

(72) Inventors: Timothy J. Hahn, Cary, NC (US); Brian J. Lang, Holly Springs, NC (US); Joshua M. Small, Cary, NC (US); Viswanath Srikanth, Chapel Hill, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 429 days.

This patent is subject to a terminal disclaimer.

(21) Appl. No.: 14/496,413

(22) Filed: Sep. 25, 2014

(65) Prior Publication Data
US 2015/0199442 A1   Jul. 16, 2015

Related U.S. Application Data

(63) Continuation of application No. 14/157,099, filed on Jan. 16, 2014.

(51) Int. Cl.
*G06F 17/30* (2006.01)
*H04L 29/08* (2006.01)

(52) U.S. Cl.
CPC .. *G06F 17/30867* (2013.01); *G06F 17/30864* (2013.01); *H04L 67/22* (2013.01); *H04L 67/26* (2013.01); *H04L 67/306* (2013.01)

(58) Field of Classification Search
CPC ............... G06F 17/30864; G06F 17/30867
USPC ........................................ 707/748
See application file for complete search history.

(56) References Cited

U.S. PATENT DOCUMENTS

| | | | |
|---|---|---|---|
| 5,937,422 A * | 8/1999 | Nelson ............ | G06F 17/30707 707/999.004 |
| 7,536,642 B2 | 5/2009 | Wilbrink et al. | |
| 7,685,199 B2 * | 3/2010 | Chandrasekar ... | G06F 17/30663 707/602 |

(Continued)

FOREIGN PATENT DOCUMENTS

EP   1755056 A1   2/2007

OTHER PUBLICATIONS

Ajanki et al.; "An Augmented Reality Interface to Contextual Information", Virtual Reality, vol. 15, Issues 2-3, Jun. 2011, pp. 161-173.

(Continued)

*Primary Examiner* — Mark E Hershley
(74) *Attorney, Agent, or Firm* — Joe Polimeni; Edell, Shapiro & Finnan, LLC (57) ABSTRACT

Techniques are described herein that facilitate monitoring one or more activities performed by a user on one or more devices, determining one or more topics of interest based on the monitored activities, preference information, and information within a user network, retrieving information from one or more network sites relating to the one or more topics of interest, and providing the retrieved information to the user.

8 Claims, 7 Drawing Sheets

(56) References Cited

U.S. PATENT DOCUMENTS

| | | | |
|---|---|---|---|
| 7,904,439 B2* | 3/2011 | Horvitz | G06F 17/30867 707/706 |
| 8,200,666 B2 | 6/2012 | Bartomeli et al. | |
| 8,380,721 B2 | 2/2013 | Rezaei et al. | |
| 8,412,796 B2 | 4/2013 | Smyth et al. | |
| 8,555,318 B2* | 10/2013 | Whitehead | H04N 7/173 725/44 |
| 9,194,716 B1 | 11/2015 | Cutter | |
| 9,224,173 B2 | 12/2015 | Arora | |
| 2005/0108001 A1* | 5/2005 | Aarskog | G06F 17/271 704/10 |
| 2005/0149496 A1* | 7/2005 | Mukherjee | G06F 17/30528 |
| 2005/0216434 A1* | 9/2005 | Haveliwala | G06F 17/30867 |
| 2006/0136357 A1* | 6/2006 | Rasmussen | G06F 17/30699 |
| 2008/0065580 A1 | 3/2008 | Spence et al. | |
| 2008/0077558 A1* | 3/2008 | Lawrence | G06F 17/30867 |
| 2010/0306249 A1* | 12/2010 | Hill | G06F 17/30867 707/769 |
| 2011/0137950 A1 | 6/2011 | Deng et al. | |
| 2011/0225235 A1 | 9/2011 | Schmidt | |
| 2011/0313657 A1 | 12/2011 | Myllymaki | |
| 2012/0095979 A1 | 4/2012 | Aftab et al. | |
| 2012/0296914 A1* | 11/2012 | Romanov | G11B 27/034 707/741 |
| 2012/0296919 A1 | 11/2012 | Sinha et al. | |
| 2013/0024504 A1 | 1/2013 | Wu | |
| 2013/0036344 A1* | 2/2013 | Ahmed | G06F 17/30867 715/205 |
| 2013/0060640 A1 | 3/2013 | Gadhia | |
| 2013/0066876 A1 | 3/2013 | Raskino et al. | |
| 2013/0091217 A1 | 4/2013 | Schneider | |
| 2013/0218885 A1 | 8/2013 | Satyanarayanan | |
| 2014/0052540 A1* | 2/2014 | Rajaram | G06Q 30/0255 705/14.66 |
| 2014/0136616 A1 | 5/2014 | Smith, IV | |
| 2014/0164365 A1* | 6/2014 | Graham | G06Q 50/01 707/723 |
| 2015/0058320 A1* | 2/2015 | Zheng | G06F 17/30864 707/722 |
| 2015/0112918 A1* | 4/2015 | Zheng | G06Q 30/02 706/48 |
| 2015/0120440 A1* | 4/2015 | Jung | G06Q 30/0253 705/14.51 |
| 2015/0172864 A1 | 6/2015 | Fabrikant | |
| 2015/0302088 A1* | 10/2015 | Wu | G06F 17/30867 706/11 |

OTHER PUBLICATIONS

IP.com et al.; "Method and System for Capturing a User Activity for Enhanced Provenance Information", IPCOM000190268D, Nov. 23, 2009, pp. 1-3.

Ontrup et al.; "Detecting, Assessing, and Monitoring Relevant Topics in Virtual Information Environments", Knowledge Data Engineering, IEEE Transactions on, vol. 21, No. 3, Mar. 2009, pp. 415-427.

* cited by examiner

PROVIDING RELEVANT INFORMATION TO A USER BASED UPON MONITORED USER ACTIVITIES IN ONE OR MORE CONTEXTS

CROSS-REFERENCE TO RELATED APPLICATIONS

This application is a continuation of U.S. patent application Ser. No. 14/157,099, entitled "PROVIDING RELEVANT INFORMATION TO A USER BASED UPON MONITORED USER ACTIVITIES IN ONE OR MORE CONTEXTS" and filed Jan. 16, 2014, the disclosure of which is incorporated herein by reference in its entirety.

BACKGROUND

1. Technical Field

Present invention embodiments relate generally to information mining, and more specifically, to identifying information proactively based on a user's context.

2. Discussion of the Related Art

Identifying information relevant to a particular topic of interest is a manual and repetitive process usually driven by keyword searches. For example, a user may manually enter various keywords into search engines, search fields of subscription-based databases or social media platforms to obtain information relevant to a particular topic. Not only is this process time consuming, but also, the search may not retrieve the most relevant information.

A common practice to identify relevant information is to monitor keyword search terms entered into a search tool, and suggest similar phrases for a subsequent keyword search. However, this practice does not provide results pro-actively, requires a user to engage in a search, and may not provide optimal information.

Another common practice involves using advertising/marketing technologies to identify, based upon user selection of a particular product, other items having similar properties or popularity among consumers. However, this practice is limited regarding the types of information that it can provide to a user, does not consider a user's context, and may not provide optimal results.

Other approaches exist as well, which involve monitoring and analyzing searches performed by a user. However, these approaches may not produce optimal information, are not performed pro-actively, and are reliant upon a user actively engaging in searching for a particular type of information.

BRIEF SUMMARY

According to embodiments of the present invention, machines, systems, computer-implemented methods and computer program products for retrieving information pertaining to an activity are provided. One or more activities performed by a user on one or more devices are monitored, one or more topics of interest are determined based on the monitored activities, preference information, and information within a user network. Information is retrieved from one or more network sites relating to the one or more topics of interest, and retrieved information is provided to the user.

These and other aspects, features and advantages of the present invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE SEVERAL VIEWS OF THE DRAWINGS

The disclosed embodiments may be better understood by referring to the figures in the attached drawings, as provided below. Generally, like reference numerals in the various figures are utilized to designate like components.

Features, elements, and aspects that are referenced by the same numerals in different figures represent the same, equivalent, or similar features, elements, or aspects, in accordance with one or more embodiments.

DETAILED DESCRIPTION

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In general, the system described herein monitors one or more activities, e.g., of a user, across one or more devices and one or more input methods. Monitored activities may include activities associated with any user task and encompass monitoring user input associated with any user device. Activities in a user's network, e.g., social network and general social sphere (e.g., friends and colleagues) may be monitored as well. Based upon the monitored activity and information specific to the user, the system determines a topics list comprising one or more topics of interest. The system then uses the one or more topics of interest as input into one or more information sources to identify relevant information. The system proactively feeds the identified relevant information to the user, thus providing information that the user would otherwise have had to search for manually, repetitively and diligently.

In contrast to known techniques, the machines, systems and methods provided herein do not require explicit entry of a search term or query into a search engine (or equivalent) in order to identify relevant information. Rather, user activity (which may or may not involve engaging in a search) along with various network information and other information may be utilized to obtain relevant information from one or more network sites.

Figure 1:
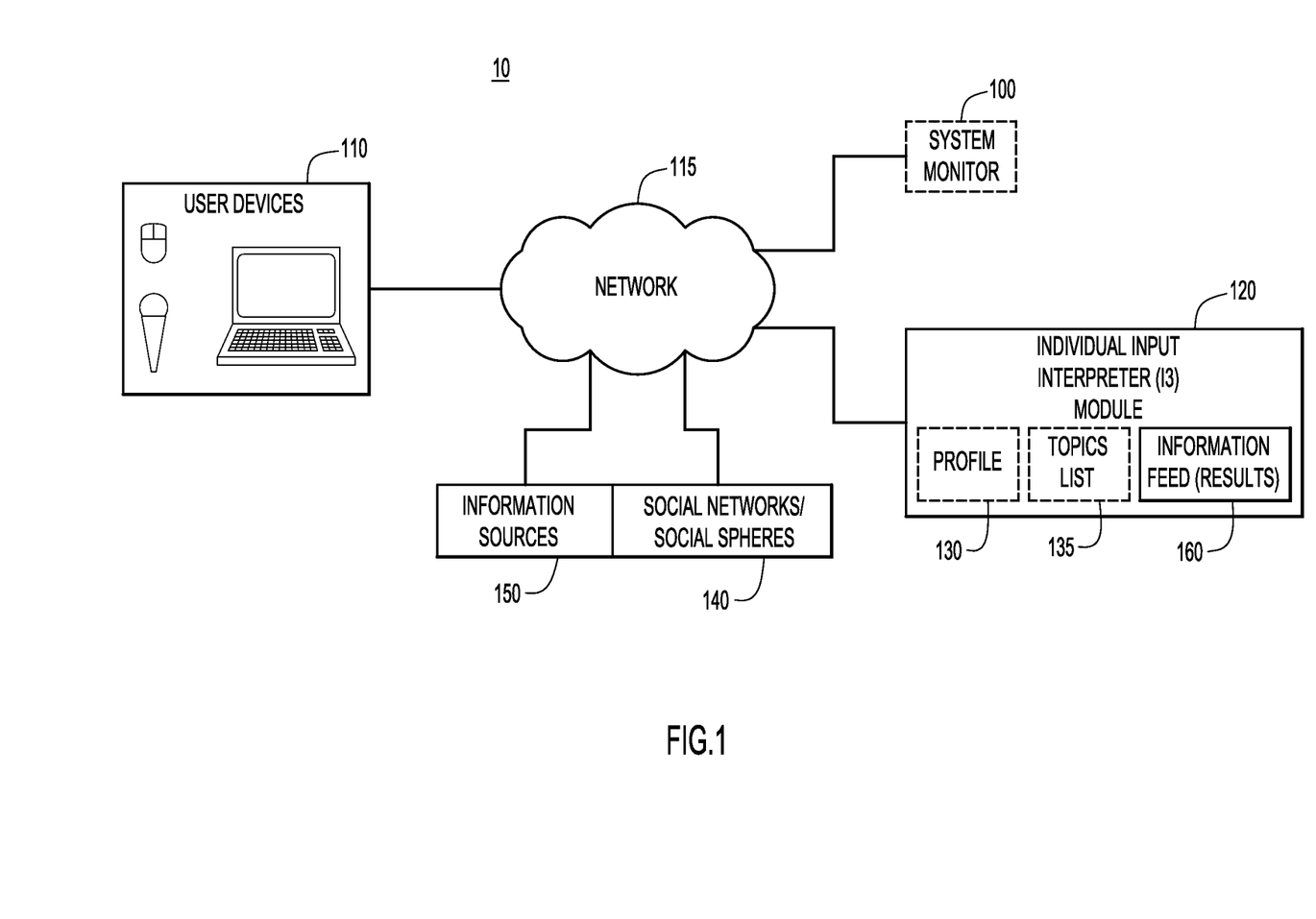
FIG. 1 is a block diagram showing an example information identification system in accordance with one embodiment of the present invention.

Referring to FIG. 1, an example environment for use with present invention embodiments relating to information identification system 10 is illustrated. A system monitor 100 may monitor activity from one or more user devices 110, via communication network 115 or locally as part of a user computer or system, and provide this information to an Individual Input Interpreter (I3) module 120. User devices 110 and module 120 may be remote from each other and communicate over network 115. Alternatively, user devices 110 and module 120 may be local to each other, and communicate via any appropriate local communication medium (e.g., local area network (LAN), hardwire, wireless link, Intranet, etc.). Module 120 utilizes received information from system monitor 100, along with profile 130 to create and maintain a topics list 135 comprising one or more topics of interest. In some approaches, module 120 may also utilize information from a user's social spheres and/or social networks 140 to identify topics of interest. Thus, module 120 has the capacity to infer a user's context, based on the aforementioned information, to determine relevant topics of interest.

Monitored activities along with user profile information may be combined to create a context describing both a user and a user's work/interests in particular subject areas. Monitored activities may include activities associated with any user task, such as preparing documents using word processing software, entering information into a spreadsheet, conducting web-based searches, sending instant messages and/or emails to colleagues, searching Intranet or Internet sites, preparing presentations, etc. Monitoring user activities encompasses monitoring user input associated with any user device, such as a keyboard, computer mouse, touchscreen, and/or devices associated with audio or video-based communication, etc.

A user's context may be based upon a variety of factors including an individual's social and/or online presence, presence of others in a user's social network, presence of content expert resources (e.g., publications, reference documents, etc.), industry experts within a user's social sphere and activities. Upon identification of relevant topics, module 120 provides these topics as input into various information sources and/or search engines 150, and may also provide these topics as input into various social networks/social spheres 140, to search for and identify relevant information. Information sources 150 and social networks/social spheres 140 are collectively referred to as network sites, and may include both Intranet and Internet sites. Results are returned to module 120, and subsequently filtered as described below to identify results to present to the user in the form of an information feed 160.

System monitor 100, although shown here as a separate module from module 120, may be combined with module 120 in some embodiments. In other embodiments, system monitor 100 may be configured to run on a server to monitor one or more user activities remotely. Alternatively, system monitor 100 may be configured to run on a user system (e.g., laptop, desktop, tablet, cell phone, etc.) to monitor one or more user activities locally. Additionally, profile 130 and topics list 135, both shown as part of module 120, may both be separate from module 120, in other embodiments.

An Internet Service Provider (ISP) may be utilized to facilitate the flow of network traffic over communication network 115 in regards to monitoring user activity on user devices 110, and sending and receiving information to social networks/social spheres 140 and information sources 150.

User devices 110 may include any device with which to provide user input (e.g., keyboard, computer mouse, microphone, camera/video, etc.) associated with performing activity/work.

User profile 130 comprises a plurality of types of information to characterize a user, which may be combined to create a usable context that describes a user's general area of work or expertise and related interests as well as recent or ongoing work in particular subject areas. User profile 130 is described in further detail herein.

Topics list 135 contains one or more topics of interest identified from monitoring user activity. Once topics of interest have been identified, module 120 provides these topics as input into a variety of information sources 150 and social networks/social spheres 140, in order to locate relevant information. Information/search sites 150 may include subscription-based databases, search engines, library catalogues, corporate databases, intranet sites and/or any other types of electronic information repositories. Social networks/social spheres 140 may include online contacts, social media sites and/or any other types of online group communications. In accordance with an embodiment of the present invention, and as described in additional detail below, a user's context may be continually rebuilt by updating an associated topics list.

In one approach, topics identified from a social network or a social sphere may be trending topics that are currently being discussed among a user's connections or colleagues. A user's social network includes any individual to which the user is connected, either directly or indirectly through a contact. Social spheres may comprise other users in a similar or the same field of work, or performing similar activities as the user. In some embodiments, information may be obtained from a social sphere in which the user is a member. In other embodiments, information may be obtained from a social sphere in which the user is not a member.

The results obtained from searching a variety of information sources 150 and social networks/social spheres 140 is filtered to provide information feed 160, which is displayed to the user. Information feed 160 may be filtered based upon a variety of factors, including relevance, historical data and user preference, in order to provide the most relevant information to a user. For example, if information obtained during a search is determined to be rated as highly relevant, e.g., by other social contacts, a credentialing system, or based on the context of the user, to a particular topic, this information may be displayed to the user while other information, deemed to be less relevant, may be displayed to the user at a later time or not at all. Additionally, in other approaches, information feed 160 is filtered so that information that has previously been sent to the user is hidden from subsequent display for a specified amount of time.

Types of information that may be provided to a user via information feed 160 include any type of digitally stored information, including, but not limited to links to references, blogs, abstracts, etc., and information allowing a user to perform a specified action such as placing a call, sending an instant message or responding to a social media post, etc.

Figure 2:
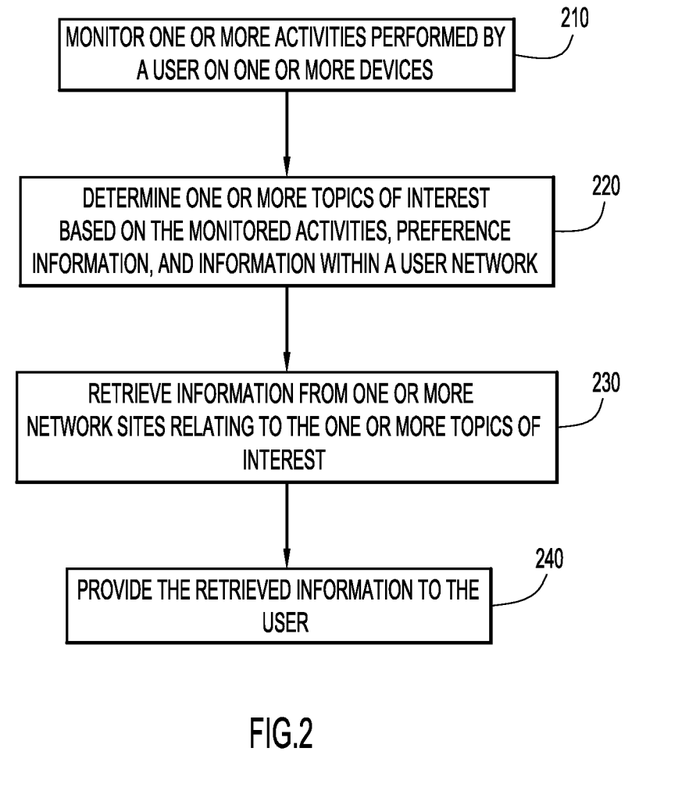
FIG. 2 is a procedural flow chart of a method of generating information relevant to a user's context in accordance with one embodiment of the present invention.

Referring to FIG. 2, a procedural flow chart is shown generally depicting the methods described herein. At operation 210, one or more activities performed by a user on one or more user devices 110 are monitored. At operation 220, one or more topics of interest are determined based on the monitored activities, preference (and in some cases profile) information, and information within a user network, e.g., a user's social network and/or social sphere. At operation 230, information is retrieved from one or more network sites relating to the one or more topics of interest. At operation 240, the retrieved information is provided to the user.

Figure 3:
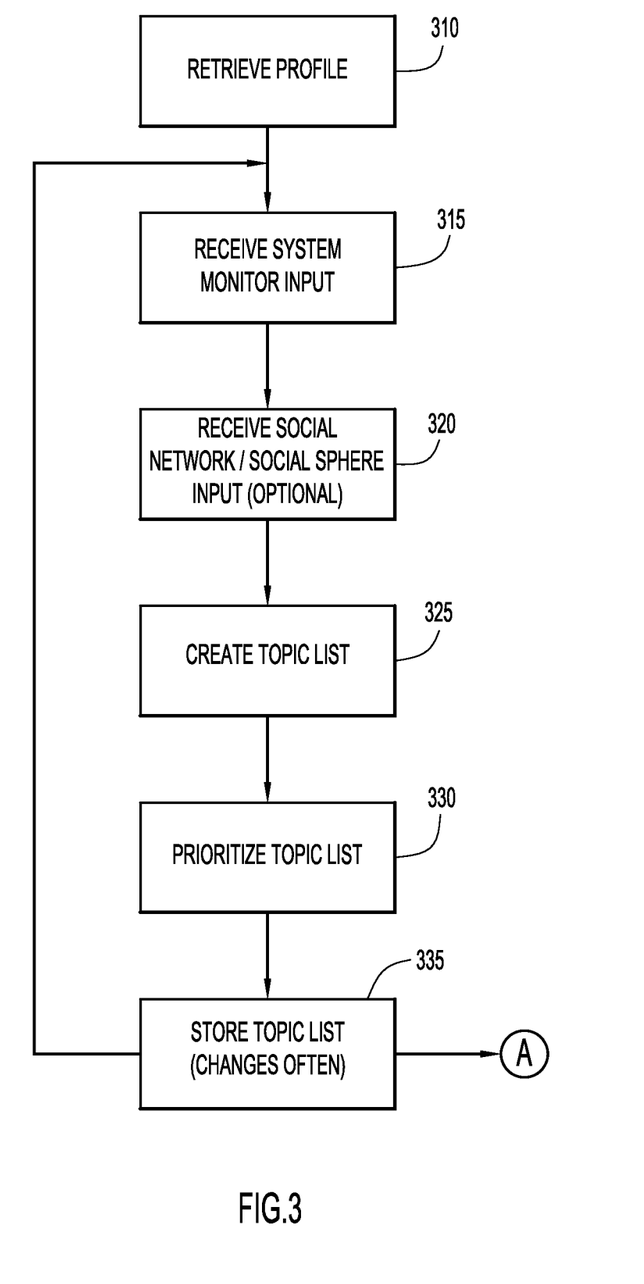
FIG. 3 is another procedural flow chart, related to FIG. 2, showing a method of creating a topics list in accordance with one embodiment of the present invention.

Referring to FIG. 3, another procedural flow chart related to FIG. 2 is shown depicting a process running in module 120. This flow chart proactively builds and updates topics list 135, as described in additional detail below. As described previously in FIG. 1, this flow diagram operates as part of system 10 to provide relevant, contextual information to a user, in a continuous manner.

At operation 310, user profile 130 is retrieved. At operation 315, input from one or more user devices, via system monitor 100, is received in order to monitor user activity. At operation 320, information from a social sphere or one or more social networks may be obtained. In some embodiments, operation 320 may be optional. If this operation is not included, the process proceeds from operation 315 to operation 325. At operation 325, one or more topics of interest are determined from information obtained in operations 310, 315 and 320, and topics list 135 is created comprising the one or more topics of interest. At operation 330, topics may be prioritized in a manner to identify topics that are more relevant to a user's context. Topics that are identified to be more relevant will be given priority as input to information sources 150 and social networks/social spheres 140, while topics that are identified to be less relevant may be selected at a later point in time or not at all. At operation 335, a topics list is stored in memory. Upon completion of operation 335, the process loops back to operation 315, where it repeats continually. Thus, this process repeats continuously in order to maintain an up-to-date (current) topics list 135. The process continues with reference to FIG. 4.

Figure 4:
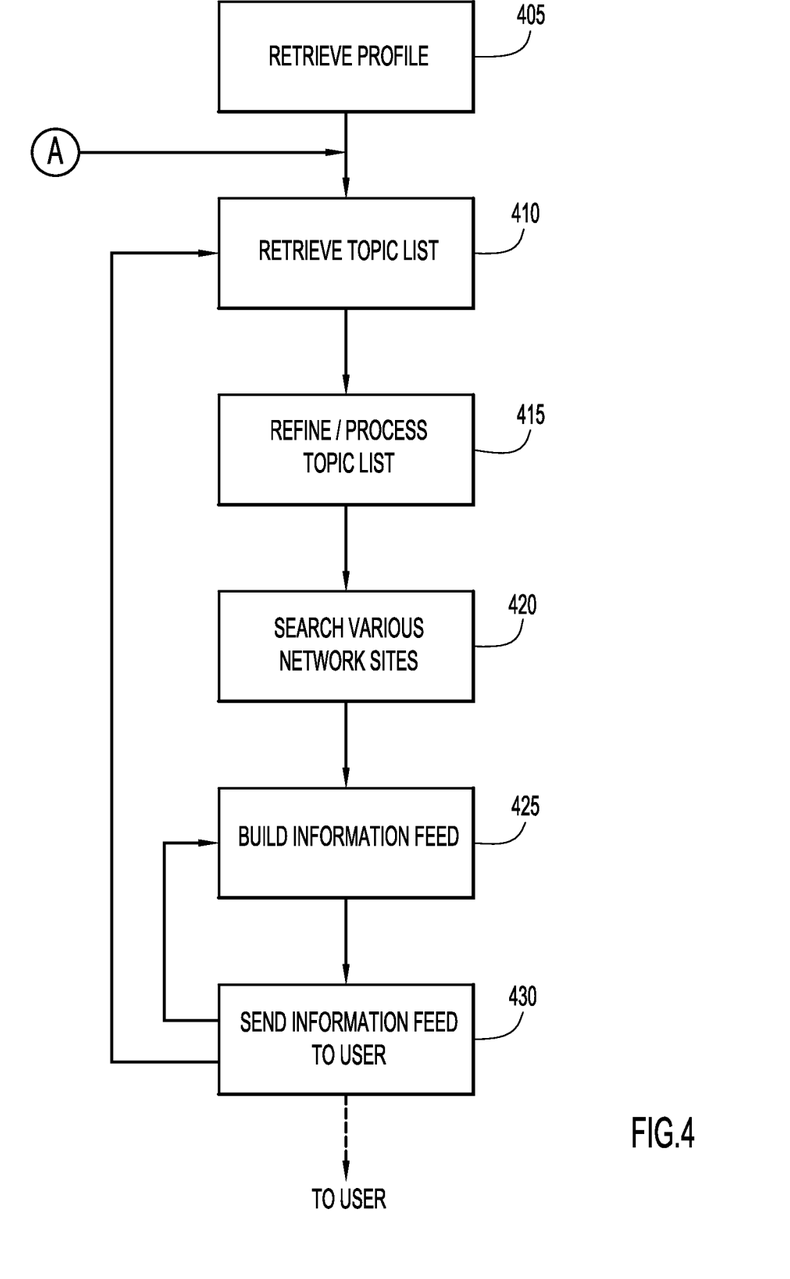
FIG. 4 is another procedural flow chart, related to FIG. 2, showing a method of utilizing a topics list to provide an information feed to a user in accordance with one embodiment of the present invention.

Referring to FIG. 4, a procedural flow chart is shown depicting another process running in module 120. It should be noted that this process can be configured so as to run simultaneously and in parallel with the process described in FIG. 3. This flow diagram retrieves a topics list 135, searches various information sources (such as information sources 150 and social networks/social spheres 140) based on the topics list to obtain relevant information, filters this information, and provides relevant targeted information to a user, as described in additional detail herein. As described previously in FIG. 1, this flow diagram operates as part of system 10 to provide relevant, contextual information to a user, based on a process operating continually. Additionally, as the topics list is updated to reflect ongoing activity, a user's context may also be updated to reflect newly identified topics of interest.

At operation 405, a user profile 130 is retrieved. At operation 410, topics list 135 is retrieved. At operation 415, the topics list may be refined/modified to include synonyms as well as consolidate redundant or overlapping topics (e.g., combine into a single search). At operation 420, the identified topics are used as input to search one or more sources of information and social networks/social spheres (collectively referred to as network sites). For example, identified topics may be provided as input to various information sources 150 (e.g., search engines) as well as social networks/social spheres 140. At operation 425, an information feed is built based upon the returned search results of operation 420. During this operation, search results may also be filtered, as described in additional detail below. At operation 430, the information feed is sent to the user. Upon receiving the information feed, a user may view, save, or ignore the information from the information feed. User feedback to the system is provided based upon a user's interaction with the information feed, as described in additional detail below. Once operation 430 concludes, the process loops back to operation 410 and repeats. As topics list 135 may have been updated in response to a user's activity, in order to provide an information feed based on a user's current activities, at operation 410, the updated topics list is reloaded. Thus, a user's own activity establishes the feed of information returned to the user. This information feed dynamically changes in priority and order based upon the changing set of information that the user is working with, supplying or acquiring.

Information in information feed 160 may include any type of digitized information, e.g., (i) usable links (or other access means) to presentations or documents, (ii) links (or other access means) to highly rated information authored by analysts or top rated blog posts, (iii) public or confidential corporate information, (iv) expert, peer-reviewed publications or references, (v) information allowing a user to perform a specified action such as placing a call, sending an instant message or responding to a social media post, and so forth. Importantly, the user does not have to perform a search across various platforms to obtain this information. Instead, the system increases the ambient knowledge of the user, by proactively providing this information via a customizable data feed.

Accordingly, information in information feed 160 may be filtered before being sent to a user for display. Information may be filtered based on relevance, historical data, and user preference information. For instance, as a user selects information from the information feed, module 120 may utilize these selections as a source of feedback, to refine determination of relevant data. Additionally, sources of information from a reputable source, e.g., a journal or other scientific or technical publication, may be given more weight than a blog from a user with limited or no credentials. As discussed previously, information that has been previously provided to a user within a specified time period may be filtered out so that a user continually receives an information flow largely comprising newly identified information.

Additionally, preference information stored as part of a user's profile may be utilized to select information for the information feed. For example, preference information may be used to customize the display of information feed to a user, allowing specific content to be displayed based on activity status (e.g., working or idle), time of day, location, etc. For example, a user may choose to receive feeds related to work activity at a certain time of day (e.g., during normal working hours). At other times, such as when a user's status is idle, the user may want to receive information based upon trending topics in the user's social networks/social spheres 140.

In some embodiments, information feed 160 may be displayed on a user screen in a scrolling fashion. Topics that scroll across a display screen and disappear as new topics are added may be accessed by a user for a defined period of time after disappearing from the display screen. Various actions can be taken by the user directly from the information feed. For example, by selecting a link (or other access means) in information feed 160, a user may access a web page containing the relevant information. In other examples, the information feed may contain links to the actual documents stored on a server, and selection of a link may cause the document to be displayed on a display screen of the user's device. Still other examples of actions include responding to a social media post by another user as well as sending a text or placing a call to another user in response to a social media post appearing in the information feed. The techniques provided herein are not limited to the particular actions of the examples provided above, but may include any action performed via a computer.

In other embodiments, the information feed may be stored in a log file for subsequent retrieval by a user to access relevant information.

In still other embodiments, the information feed, presented as a prioritized list (ordered list) of results, may be updated at a prescribed interval to ensure that a user is receiving information associated with recently identified topics of interest. For example, an application could be utilized to update an information feed at a specified time interval, to ensure that the latest results are being provided to the user.

Figure 5:
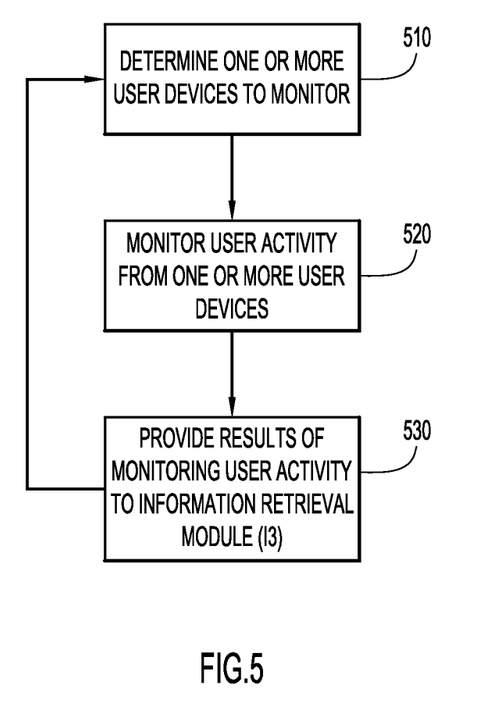
FIG. 5 is a procedural flow chart, related to FIG. 2, showing a method of monitoring user activity in accordance with one embodiment of the present invention.

Referring to FIG. 5, a flow diagram is shown depicting a process running concurrently in system monitor 100. The flow diagram monitors user activity, as described in additional detail below. As described previously in FIG. 1, this flow diagram operates as part of system 10 to provide relevant, contextual information to a user based on this process, which operates continually and simultaneously. The process of FIG. 5 may operate on a separate computing device that is in communication with module 120, may operate on the same computing device hosting module 120, or be integrated with module 120.

At operation 510, one or more user devices are selected/determined to be monitored. At operation 520, system monitor 100 engages in monitoring user activity from the one or more selected devices. At operation 530, the results of monitoring activity are provided to module 120. At the conclusion of operation 530, the process loops back to operation 510 and repeats continually.

The system and corresponding methods described herein and with reference to FIGS. 1-5 provide a number of benefits. For example, one benefit is that information on a subject may be retrieved and supplied to a user solely based on a user's activity. In other words, the user does not have to actively seek out information, such as by searching a variety of different systems/sites, to obtain relevant information on a particular subject. Instead, the system proactively identifies topics based on a user's activities, searches for relevant information, and returns relevant information, e.g., in the form of an information stream to a user. Thus, by performing normal work activities, a user is provided with a continuous feed of information, relevant to the activity that the user is performing.

As an example, if a user is working on a paper (e.g., within a word processing document utilizing one or more user devices 110) related to the "Impact of Digital Marketing", the system may identify "Digital Marketing", "Digital", or "Marketing", "Impact" or "Impact of Digital Marketing" as potential topics of interest. If the topics of "Impact of Digital Marketing" or "Digital Marketing" is selected as search terms (the individual terms may be determined to be too broad), a variety of information related to these topics will be provided to the user proactively, meaning that the user does not have to perform an explicit search to receive relevant information. On the other hand, should a user perform an explicit search using a search engine, the search terms entered into the search engine may also be included as topics of interest in topics list 135 by module 120.

Figure 6:
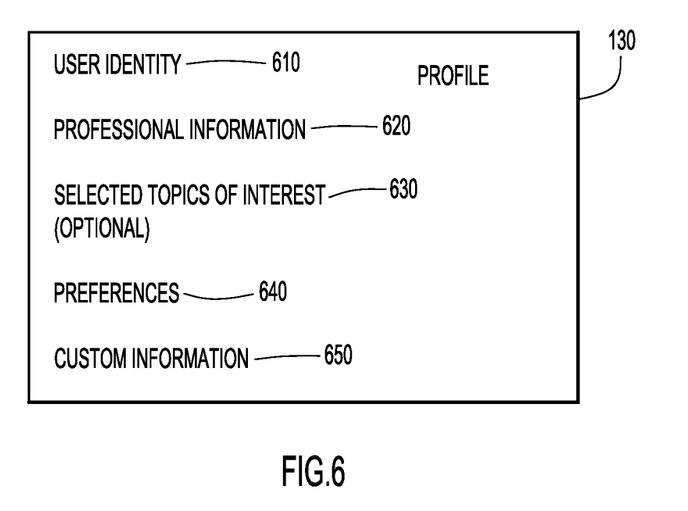
FIG. 6 is an example illustration of profile information in accordance with one embodiment of the present invention.

Referring to FIG. 6, an example user profile 130 is shown. Profile information may include information to identify a user identity 610, e.g., a user name, user login, etc. User profile 130 may also include professional information 620 to identify information related to a user's field of work, e.g., job title, job function, information regarding which corporate division or department that a user is a member of, area(s) of expertise, etc. One or more topics of interest 630 may be included in a user profile 130 as well, with such topics identified from monitoring user activity. In some embodiments, topics of interest added to a profile are topics of interest that occur with high frequency and/or relevancy based upon user monitoring. Preference information 640 may also be included. As discussed previously, preference information 640 may be used to customize the display of information, allowing specific content to be displayed based on activity status (e.g., working or idle), time of day, location, environment, proximity of acquaintances, motion of the one or more devices, etc. Additionally, user profile 130 is fully customizable, and additional types of information may be added to establish user context, and tailor a data feed to a particular user.

Profile 130 may be utilized to create a context describing a user's work as well as recent or ongoing activity in particular subject areas. Thus, profile 130 is a unique user profile containing relevant information about a user, utilized by module 120 to determine relevant information.

User profiles may also include links (or other access means) to non-public sources of information to which a user may have access, e.g., company specific sites, subscription-based or restricted information, confidential reports, etc. User credentials to access non-public sources of information may also be stored in a user's profile or at another site accessible by module 120, and are supplied to a server hosting a source of non-public information to allow access to such information.

User profile 130 may also be updated on an ongoing basis. For example, information pertaining to user activities may be proactively fetched by system monitor 100 and used to update user profile 130 to maintain contexts associated with the user. Such contexts may be based on current activities as well as from topics that are trending in the user's social networks and/or social spheres 140. For example, topics of interest 630 may be updated based on newly performed activities.

Figure 7:
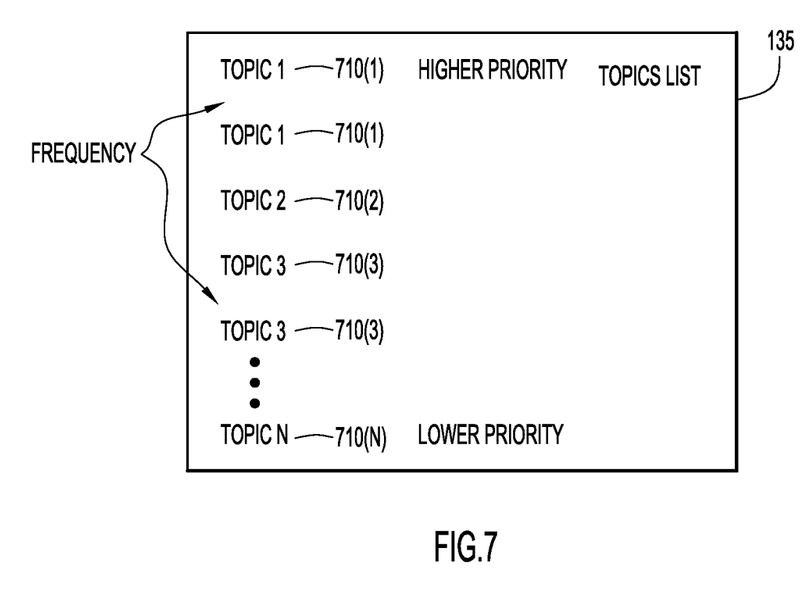
FIG. 7 is an example illustration of a topics list ranked based on prioritization of topics in accordance with one embodiment of the present invention.

Referring to FIG. 7, an example topics list 135 is shown. In one embodiment, topics determined to have higher priority are listed at the top of the list, while topics determined to have lower priority are listed at the bottom of the list. Topics at the top of the list (higher priority) are provided as input into information sources 150 or social networks/social spheres 140 prior to topics having lower priority.

As discussed previously, topics may be prioritized for display to a user based on a variety of factors. Initially, identified topics may be arranged in an order corresponding to input generated by user activity, which may not be optimal with regard to relevance. Therefore, topics may need to be prioritized based upon a variety of factors such as preference information, relevance, custom information, etc. to provide optimal results to a user. In other approaches, topics that are recently identified may be given a higher priority than older topics.

Relevance may be determined based upon a weighting of various factors including a user's work or monitored activities, profile and/or preference information, activities in the user's network (social network and social sphere). Accordingly, one or more topics of interest may be determined based on weighting of monitored activities. Additionally, frequency of an identified topic may also impact weighting. For example, frequency may reflect the number of times a topic (or a similar topic) was identified based upon user activity, and therefore, a topic with a higher frequency may be assigned a higher weighting, and therefore have a higher priority, than a topic with a lower frequency (and lower weighting).

For example, when a user is actively working, topics may be identified that are related to the category of work being performed. These topics may receive a higher weighting than other topics, e.g., topics trending in a user's social sphere. On the other hand, if the user is not actively engaged in an activity, other identified topics (e.g., not work-related) may receive a higher weighting. This type of information display may be specified as part of user preference information 640. Additionally, relevance of a topic may be determined in part by the source of the information, etc.

In further aspects, a variety of algorithms could be employed in the prioritization operation, which continually updates prioritization of topics as new topics are added and also based on user activity. These algorithms may take into account a variety of additional environmental, temporal, and spatial factors, in addition to the factors previously discussed, including time of day, current location, proximity of acquaintances, current motion of the user/device, and dynamic determination of environment (e.g. work vs. home vs. en-route vs. traveling vs. vacation, etc.).

As previously described herein, one or more topics of interest may be added to a user's profile to establish a user's context. For example, topics having higher priority may be selected for addition to a user's profile.

In still other embodiments, topics information stored in a user's profile or within topics list 135 may be permitted to age, such that older topics or less frequently identified topics having a lower weighting, are discarded, allowing newer topics to be stored. In other words, a topics list may contain N topics of interest, where N can be any suitable value for a particular system environment.

Figure 8:
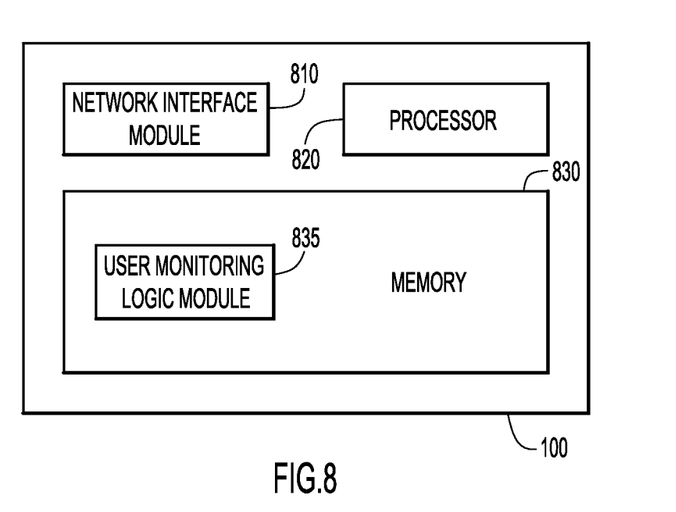
FIG. 8 is an example block diagram of an apparatus capable of monitoring user activity in accordance with one embodiment of the present invention.

FIG. 8 illustrates an example block diagram of monitor 100, configured to perform the techniques presented herein. Monitor 100 may include a network interface unit 810, a processor 820, and a memory 830. The network interface unit 810 is configured to enable network communications over network 115 to send information to module 120 (if applicable) regarding a user's activity as shown in FIG. 1.

The processor 820 may be embodied by one or more microprocessors or microcontrollers, and executes computer readable program instructions stored in memory 830 for user monitoring logic 835 to perform the operations described above in connection with FIGS. 1-2 and 5.

Memory 830 may be embodied by one or more computer readable storage media that may comprise e.g., read-only memory (ROM), static random access memory (SRAM), magnetic disk storage media devices, optical storage media devices, flash memory devices, electrical, optical, or other physical/tangible memory storage devices.

Thus, in general, the memory 830 may comprise one or more tangible (e.g., non-transitory) computer readable storage media (e.g., a memory device) encoded with software comprising computer readable program instructions, and when the software is executed by the processor 820, the processor 820 is operable to perform the operations described herein in connection with user monitoring logic 835.

Figure 9:
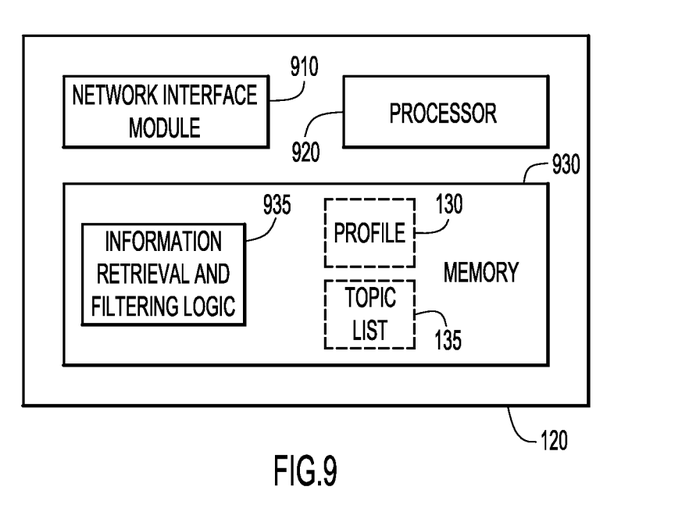
FIG. 9 is an example block diagram of an apparatus capable of identifying and providing relevant information to a user in accordance with one embodiment of the present invention.

FIG. 9 illustrates an example block diagram of module 120, configured to perform the techniques presented herein. Module 120 includes a network interface unit 910, a processor 920, and a memory 930. The network interface unit 910 is configured to enable network communications over network 115 to send information to a user device, to receive information regarding a user's activity from system monitor 100, as shown in FIG. 1, and to retrieve information from one or more networking and information sources.

The processor 920 may be embodied by one or more microprocessors or microcontrollers, and executes computer readable program instructions stored in memory 930 for information retrieval and filtering logic 935 to perform the operations described above in connection with FIGS. 1-4, 6 and 7.

Memory 930 may be embodied by one or more computer readable storage media that may comprise, e.g., read-only memory (ROM), static random access memory (SRAM), magnetic disk storage media devices, optical storage media devices, flash memory devices, electrical, optical, or other physical/tangible memory storage devices.

Thus, in general, the memory 930 may comprise one or more tangible (e.g., non-transitory) computer readable storage media (e.g., a memory device) encoded with software comprising computer readable program instructions, and when the software is executed by the processor 920, the processor 920 is operable to perform the operations described herein in connection with information retrieval and filtering logic 935.

It will be appreciated that the embodiments described above and illustrated in the drawings represent only a few of the many ways of implementing embodiments for proactively providing relevant information to a user.

The various modules (e.g., individual input interpreter module, network interface module, user monitoring logic module, information retrieval and filtering logic module, etc.) described herein which perform the various functions of present invention embodiments may be implemented by any combination of any quantity of software and/or hardware modules or units, and may reside within memory of a server and/or client systems for execution by a processor.

Server systems and client systems associated with user devices 110, system monitor 100, and module 120 may be implemented by any conventional or other computer systems preferably equipped with a display or monitor, a base (e.g., including at least one processor, one or more memories, and/or internal or external network interfaces or communications devices (e.g., modem, network cards, etc.)), optional input devices (e.g., a keyboard, mouse or other input device), and any commercially available and custom software (e.g., server/communications software, module, browser/interface software, etc.).

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, image generation module, profile comparison module, etc.). These systems may include any types of monitors and input devices (e.g., keyboard, mouse, voice recognition, computer displays, heads-up displays (HUD), etc.) to enter and/or view information.

It is to be understood that the software (e.g., module 120, system monitor 100, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., a LAN, a wide area network (WAN), Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation. The present invention embodiments are not limited to the specific tasks or algorithms described above.

The software of the present invention embodiments (e.g., module 120, system monitor 100, etc.) may be available on a non-transitory computer useable medium (e.g., magnetic or optical mediums, magneto-optic mediums, floppy diskettes. CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

The system may employ any number of any conventional or other databases, data stores or storage structures (e.g., files, databases, data structures, data or other repositories, etc.) to store information (e.g., user profile, topics of interest, information feed, etc.). The database system may be implemented by any number of any conventional or other databases, data stores or storage structures (e.g., files, databases, data structures, data or other repositories, etc.) to store information (e.g., profile, topics list, results associated with information feed, etc.). The database system may be included within or coupled to the server and/or client systems. The database systems and/or storage structures may be remote from or local to the computer or other processing systems, may communicate via any appropriate communication medium (e.g., LAN, WAN, Internet, hardwire, wireless link, Intranet, etc.), and may store any desired data.

The present invention embodiments may employ any number of any type of user interface (e.g., Graphical User Interface (GUI), command-line, prompt, menu screens, etc.) for obtaining or providing information (e.g., profile, topics list, results associated with information feed, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report (e.g., information feed, etc.) may include any information arranged in any fashion, and may be configurable based on rules or other criteria to provide desired information to a user (e.g., text analytics, profile scores, demographic information pertaining to the document author, etc.).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Javascript, Python, Perl, Ruby, Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments have been chosen and described herein in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of retrieving information pertaining to an activity comprising:

monitoring one or more activities performed by a user on one or more devices;

determining one or more topics of interest based on the monitored activities, profile information, and information within a user network;

weighting topics of interest that are related to a category of work being performed higher than other topics of interest when the user is actively working, whether the user is actively working being determined based on the profile information which includes working hours of the user;

weighting non-work-related topics of interest higher than work-related topics of interest when the user is not actively working;

prioritizing the determined one or more topics of interest based upon a plurality of factors including a weight of each of the one or more topics of interest;

retrieving information from one or more network sites relating to the prioritized one or more topics of interest; and providing the retrieved information to the user.

2. The computer-implemented method of claim 1, wherein determining the one or more topics of interest includes:

updating the one or more topics of interest based on at least one of newly performed activities, environment, time of day, location, proximity of acquaintances, and motion of the one or more devices.

3. The computer-implemented method of claim 1, wherein determining the one or more topics of interest includes:

weighting the monitored activities, the profile information, and the information within a user network and determining the one or more topics of interest based on the weighting.

4. The computer-implemented method of claim 1, wherein providing the retrieved information includes:

filtering the retrieved information based on at least one of relevance, historical data, and user preference information.

5. The computer-implemented method of claim 1, further comprising:

providing feedback for the retrieved information based on user actions associated with the retrieved information.

6. The computer-implemented method of claim 1, wherein:

monitoring comprises continuously monitoring one or more activities performed by a user on one or more devices;

determining comprises continuously determining one or more topics of interest based on the monitored activities, the profile information, and the information within a user network;

retrieving comprises continuously retrieving the information from the one or more network sites relating to the one or more topics of interest; and providing comprises continuously providing the retrieved information to the user.

7. The computer-implemented method of claim 5, further comprising determining topics of interest based upon the feedback supplied by a user, wherein the feedback comprises user selection of previously provided information.

8. The computer-implemented method of claim 1, further comprising:

determining a frequency for a topic of interest based upon occurrence of the topic of interest in a monitored activity; and assigning a higher weighting to a topic of interest having a higher frequency than a topic of interest having a lower frequency.

* * * * *